United States Patent
Tanno et al.

(10) Patent No.: US 10,422,270 B2
(45) Date of Patent: Sep. 24, 2019

(54) AIR GUIDE STRUCTURE FOR AN ENGINE COMPARTMENT OF A VEHICLE

(71) Applicants: Masahiro Tanno, Nissin (JP); Yuto Korogi, Miyoshi (JP); Kazuyoshi Ogata, Toyota (JP); Akira Nishino, Toyota (JP)

(72) Inventors: Masahiro Tanno, Nissin (JP); Yuto Korogi, Miyoshi (JP); Kazuyoshi Ogata, Toyota (JP); Akira Nishino, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 14/433,810

(22) PCT Filed: Jan. 3, 2014

(86) PCT No.: PCT/IB2014/000004
§ 371 (c)(1),
(2) Date: Apr. 6, 2015

(87) PCT Pub. No.: WO2014/108788
PCT Pub. Date: Jul. 17, 2014

(65) Prior Publication Data
US 2015/0252716 A1    Sep. 10, 2015

(30) Foreign Application Priority Data

Jan. 11, 2013   (JP) ................................ 2013-003794

(51) Int. Cl.
*F01P 11/10*    (2006.01)
*B60K 13/04*    (2006.01)
(Continued)

(52) U.S. Cl.
CPC ............... *F01P 11/10* (2013.01); *B60K 11/08* (2013.01); *B60K 13/04* (2013.01); *B62D 25/082* (2013.01);
(Continued)

(58) Field of Classification Search
USPC ..................................................... 123/41.58
See application file for complete search history.

(56) References Cited

U.S. PATENT DOCUMENTS 4,494,723 A * 1/1985 Kobuki ................ B60K 5/1208
                                                  180/312
8,689,925 B2 * 4/2014 Ajisaka ................. F01N 3/2006
                                                  180/309

(Continued)

FOREIGN PATENT DOCUMENTS

CN     1190339 C    2/2005
EP     1167164 A1   1/2002
(Continued)

*Primary Examiner* — Lindsay M Low
*Assistant Examiner* — Ruben Picon-Feliciano
(74) *Attorney, Agent, or Firm* — Oliff PLC (57) ABSTRACT

In an engine room, heat insulators are provided on the rear side in the forth and back direction of a vehicle with respect to an engine and on the front side in the forth and back direction of the vehicle with respect to a dash panel arranged on a back side of the vehicle with respect to the engine. A top flange portion is formed at a top of a first heat insulator. The top flange portion is extending in a direction obliquely upward and backward of the vehicle to guide air heated by an exhaust system from the engine in an upward direction of the vehicle. A top bent portion is formed at a top of a second heat insulator such that the top bent portion is arranged in the vicinity of the cowling panel in order to guide the heated air in an upward direction of the vehicle.

7 Claims, 6 Drawing Sheets

(51) Int. Cl.
- *B62D 25/08* (2006.01)
- *F01N 13/14* (2010.01)
- *B62D 25/14* (2006.01)
- *B62D 49/00* (2006.01)
- *B60K 11/08* (2006.01)

(52) U.S. Cl.
CPC ............ *B62D 25/14* (2013.01); *B62D 49/00* (2013.01); *F01N 13/14* (2013.01); *F01N 2260/022* (2013.01); *F01N 2260/20* (2013.01)

(56) References Cited

U.S. PATENT DOCUMENTS

2001/0054831 A1* 12/2001 Akasaka ................ B60K 13/04
  180/309
2007/0259263 A1* 11/2007 Shibuya ................ H01M 2/105
  429/186

FOREIGN PATENT DOCUMENTS

| | | |
|---|---|---|
| JP | H09-175198 A | 7/1997 |
| JP | H11-129938 A | 5/1999 |
| JP | H11-198663 A | 7/1999 |
| JP | 2002-002549 A | 1/2002 |
| JP | 2004-316611 A | 11/2004 |
| JP | 2010-101234 A | 5/2010 |

* cited by examiner

AIR GUIDE STRUCTURE FOR AN ENGINE COMPARTMENT OF A VEHICLE

BACKGROUND OF THE INVENTION

1. Field of the Invention

The present invention relates to an air guide structure of vehicle.

2. Description of Related Art

Japanese Patent Application Publication No. 2010-101234 (JP 2010-101234 A) has disclosed a structure in which a dash panel configured to divide an engine room from a vehicle compartment is provided with a heat insulator.

In the structure described in the above-mentioned JP 2010-101234 A, when the engine is stopped (so-called dead soak time) after a high-load operation, heat generated from an exhaust system of engine flows upward of the vehicle due to natural convection. However, no special countermeasure has been made for this heated airflow, so that the airflow is disorderly. Consequently, this may result in expansion of a range to which heat damage countermeasure for components arranged within an engine room should be taken.

SUMMARY OF THE INVENTION

In views of the above-described circumstances, an object of the present invention is to provide an air guide structure of vehicle capable of suppressing the expansion of the range to which heat damage countermeasure should be taken within the engine room.

The aforementioned air guide structure of vehicle includes a heat insulator provided within the engine room. The heat insulator is provided on at least one place of rear side in the forth and back direction of a vehicle with respect to an engine arranged within the engine room, and front side in the forth and back direction of the vehicle with respect to a dash panel arranged on the backward side of the vehicle with respect to the engine. The aforementioned structure further includes an air guide portion which is formed at a top of the heat insulator and arranged to guide air heated by an exhaust system from the engine upward of the vehicle.

In the air guide structure of vehicle, the heat insulator may be arranged to cover components provided on front side in the forth and back direction of the vehicle with respect to the dash panel. The air guide portion may be formed at a top end of the heat insulator and arranged in the vicinity of a cowling arranged on an upper side of the vehicle with respect to the dash panel.

In the air guide structure of vehicle, the heat insulator may be provided on rear side in the forth and back direction of the vehicle with respect to the engine. The air guide portion may be formed at a top end of a vertical wall portion of the heat insulator. The air guide portion may be constructed as a flange portion extending from the vertical wall portion obliquely upward with respect to a vehicle or from the vertical wall portion horizontally in the forth and back direction of the vehicle.

The air guide structure of vehicle may include bent portions provided on both sides in the width direction of the vehicle with respect to the heat insulator provided on front side in the forth and back direction of the vehicle with respect to the dash panel. The bent portions may be bent forward of the vehicle to front side of the vehicle.

The air guide structure of vehicle may include bent portions provided on the heat insulator to cover components provided on rear side in the forth and back direction of the vehicle with respect to the engine. The bent portions may be provided on both sides in the width direction of the vehicle with respect to the heat insulator and bent to rear side of the vehicle.

In an engine room according to the air guide structure of vehicle, heat insulators are provided on at least one place of rear side in the forth and back direction of a vehicle with respect to an engine, and front side in the forth and back direction of the vehicle with respect to the dash panel. An air guide portion to guide air heated by an exhaust system from the engine upward of the vehicle, is formed at the top end of the heat insulator. Consequently, when air heated by the exhaust system from the engine at the time of dead soak rises upward of the vehicle, the heated air (hot air) is guided upward of the vehicle by the air guide portion at the top end of the heat insulator. Consequently, air heated within the engine room is prevented, from flowing disorderly thereby suppressing expansion of a range to which heat damage countermeasure is to be taken within the engine room.

According to the air guide structure of vehicle, the heat insulator is arranged to cover the components on front side in the forth and back direction of the vehicle with respect to the dash panel and the air guide portion formed at the top end of the heat insulator is constructed as a member arranged in the vicinity of the cowling provided on the upper side of the vehicle with respect to the dash panel. Consequently, the air heated within the engine room is prevented from flowing toward components on the front side in the forth and back direction of the vehicle of the dash panel through a gap between the top end of the heat insulator and the cowling, thereby suppressing expansion of a range to which heat damage countermeasure is to be taken, effectively.

According to the air guide structure of vehicle, the air guide portion is constructed as a flange portion extending from the vertical wall portion of the heat insulator obliquely upward with respect to the vehicle or from the vertical wall portion of the heat insulator horizontally in the forth and back direction of the vehicle. Consequently, air heated within the engine room is guided obliquely upward of the vehicle along the flange portion or along the forth and back direction of the vehicle. Thus, the heated air is prevented from going around toward the rear side in the forth and back direction of the vehicle of the engine or toward the front side in the forth and back direction of the vehicle of the dash panel, thereby suppressing expansion of the range to which the heat damage countermeasure is to be taken, effectively.

According to the air guide structure of vehicle, the bent portions which are bent forward of the vehicle are provided on both sides in the width direction of the vehicle with respect to the heat insulator provided on front side in the forth and back direction of the vehicle with respect to the dash panel. Consequently, air heated within the engine room is prevented by the bent portions from striking the front side in the forth and back direction of the vehicle of the dash panel. Thus, expansion of the range to which the heat damage countermeasure is to be taken can be suppressed effectively.

According to the air guide structure of vehicle, the heat insulator is arranged to cover components on rear side in the forth and back direction of the vehicle with respect to the engine and the bent portions which are bent to rear side of the vehicle are provided on both sides in the width direction of the vehicle of the heat insulator. Consequently, air heated within the engine room is prevented by the bent portions from striking components on the rear side in the forth and back direction of the vehicle of the engine. Thus, expansion of the range to which the heat damage countermeasure is to be taken can be suppressed effectively.

The air guide structure of vehicle can suppress expansion of the range to which the heat damage countermeasure is to be taken within the engine room.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a first embodiment of the air guide structure of vehicle according to the present invention will be described with reference to FIGS. 1 to 4. In these drawings, an arrow FR indicated as appropriate indicates a forward direction of a vehicle, an arrow UP indicates an upward direction of the vehicle and an arrow OUT indicates an outward direction in the width direction of the vehicle.

Figure 1:
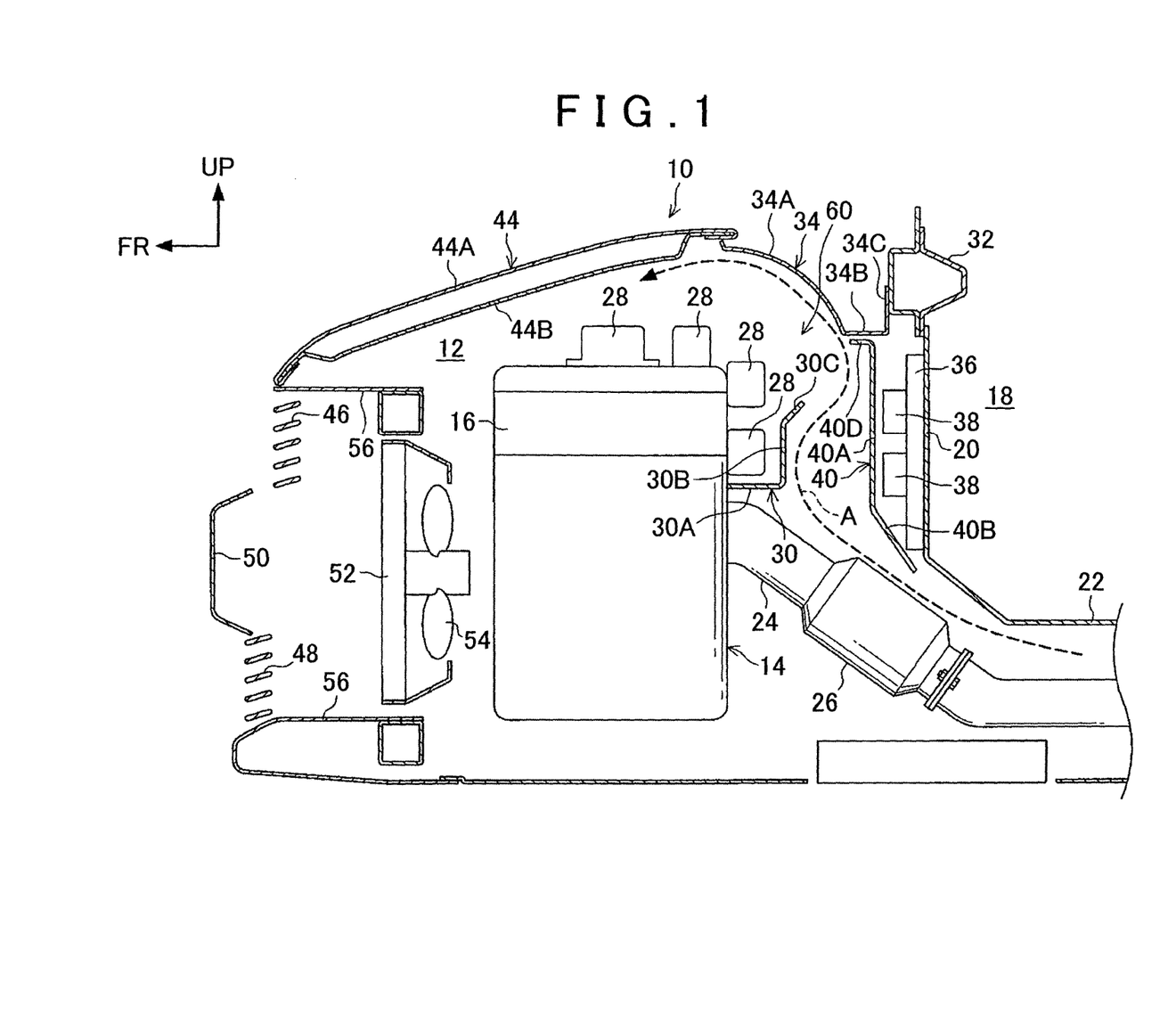
FIG. 1 is a side sectional view showing an interior of an engine room arranged in a front section of vehicle to which, the air guide structure of vehicle according to a first embodiment is applied.

FIG. 1 shows a side cross-sectional view of an engine room located on the front side of a vehicle to which the air guide structure of the vehicle 60 according to the present embodiment is applied. As shown in FIG. 1, an engine room 12 is provided on the front side of a vehicle 10 and an engine 14 is arranged within the engine room 12. On the backward side of the vehicle of the engine room 12, a dash panel 20 for partitioning the engine room 12 from a vehicle compartment 18 extends substantially along the vertical direction of the vehicle. A downward side of the dash panel 20 with respect to the up and down direction of the vehicle is bent backward of the vehicle and its bent portion is connected to a tunnel portion 22 arranged in the forth and back direction of the vehicle.

An exhaust pipe 24 is connected to a rear wall portion of the engine 14, located on a backward side of the vehicle as exhaust system for discharging exhaust gas. The exhaust pipe 24 extends obliquely downward and backward of the vehicle from the rear wall portion of the engine 14 and a catalytic converter (exhaust system) 26 for purifying exhaust gas is provided in the middle of the exhaust pipe 24.

A plurality of components 28 are arranged on the top surface and the rear wall portion of an engine head 16 located on the upper side of the vehicle of the engine 14. Further, a heat insulator 30 is provided on the rear wall portion of the engine 14 to protect the lower components 28 arranged on the rear wall portion of the engine head 16. The heat insulator 30 prevents heat generated from the exhaust pipe 24, the catalytic converter 26 and the like from affecting the components 28 on the rear wall portion of the engine head 16. The heat insulator 30 will be described in detail below.

A cowling reinforcement 32 is arranged at a top end of the dash panel 20 in the vertical direction of the vehicle such that it extends substantially along the width direction of the vehicle. The cowling reinforcement 32 is constructed in a closed sectional structure by joining together ends of two upper and lower panels which make a pair with each other. A concave cowling panel (cowling) 34 formed so as to open upward of the vehicle is connected to a front wall portion of the cowling reinforcement 32.

The cowling panel 34 includes a curved portion 34A located on a forward side of the vehicle which is formed such that it is curved substantially in a convex shape with respect to upward of the vehicle, a bottom face portion 34B which extends backward of the vehicle from a rear end of the curved portion 34A and a vertical wall portion 34C which extends upward of the vehicle from a rear end of the bottom face portion 34B. A top end of a vertical wall portion 34C of the cowling panel 34 is connected to the front wall portion of the cowling reinforcement 32.

A plurality of components 38 are arranged on a mounting portion 36 arranged on the front wall side of the dash panel 20. A heat insulator 40 is provided on the front wall portion of the dash panel 20 so as to cover the plurality of the components 38. The heat insulator 40 prevents heat generated from the exhaust pipe 24, the catalytic converter 26 and the like from affecting the components 38 arranged on the front wall portion of the dash panel 20. The heat insulator 40 will be described in detail below.

A hood 44 is provided on a forward side of the vehicle of the cowling panel 34 such that it covers an upper side of the vehicle of the engine room 12. The hood 44 includes a hood outer panel 44A arranged on a top side of the vehicle (outer side of the vehicle) substantially in the width direction and substantially in the forth and back direction of the vehicle, and a hood inner panel 44B arranged on a downward side of the vehicle of the hood outer panel 44A (on the side of the engine room 12) substantially in the width direction and substantially in the forth and back direction of the vehicle. In the hood 44, a peripheral portion of the hood inner panel 44B and a peripheral portion of the hood outer panel 44A are integrated into a closed sectional structure by hemming. That is, there is formed a hollow space between the hood outer panel 44A and the hood inner panel 44B.

The hood 44 is so constructed to be capable of being opened/closed with respect to the vehicle main body through a hinge arm (not shown) provided on both ends in the width direction of the vehicle on a rear end thereof in the forth and back direction of the vehicle.

On the front face of the vehicle 10, an upper grill 46 is provided on its upper side and a lower grill 48 is provided on its lower side. A front bumper cover 50 is provided in the intermediate area in the vertical direction of the vehicle between the upper grill 46 and the lower grill 48 such that it extends substantially along the width direction of the vehicle. Although not shown, the front bumper cover 50 is provided in the front of a front bumper reinforcement arranged substantially in the width direction of the vehicle.

A radiator 52 for cooling the cooling water for the engine 14 is provided in forward side of the vehicle of the engine 14 and a fan 54 is arranged on the backward side of the vehicle relative to the radiator 52. Sheet-like deflectors 56 are arranged on a forward side of the vehicle relative to the radiator 52 such that they surround four sides of the radiator 52. Upon traveling of the vehicle 10, air flow introduced through the upper grill 46 and the lower grill 48 is brought to the radiator 52 as cooling wind.

Figure 2:
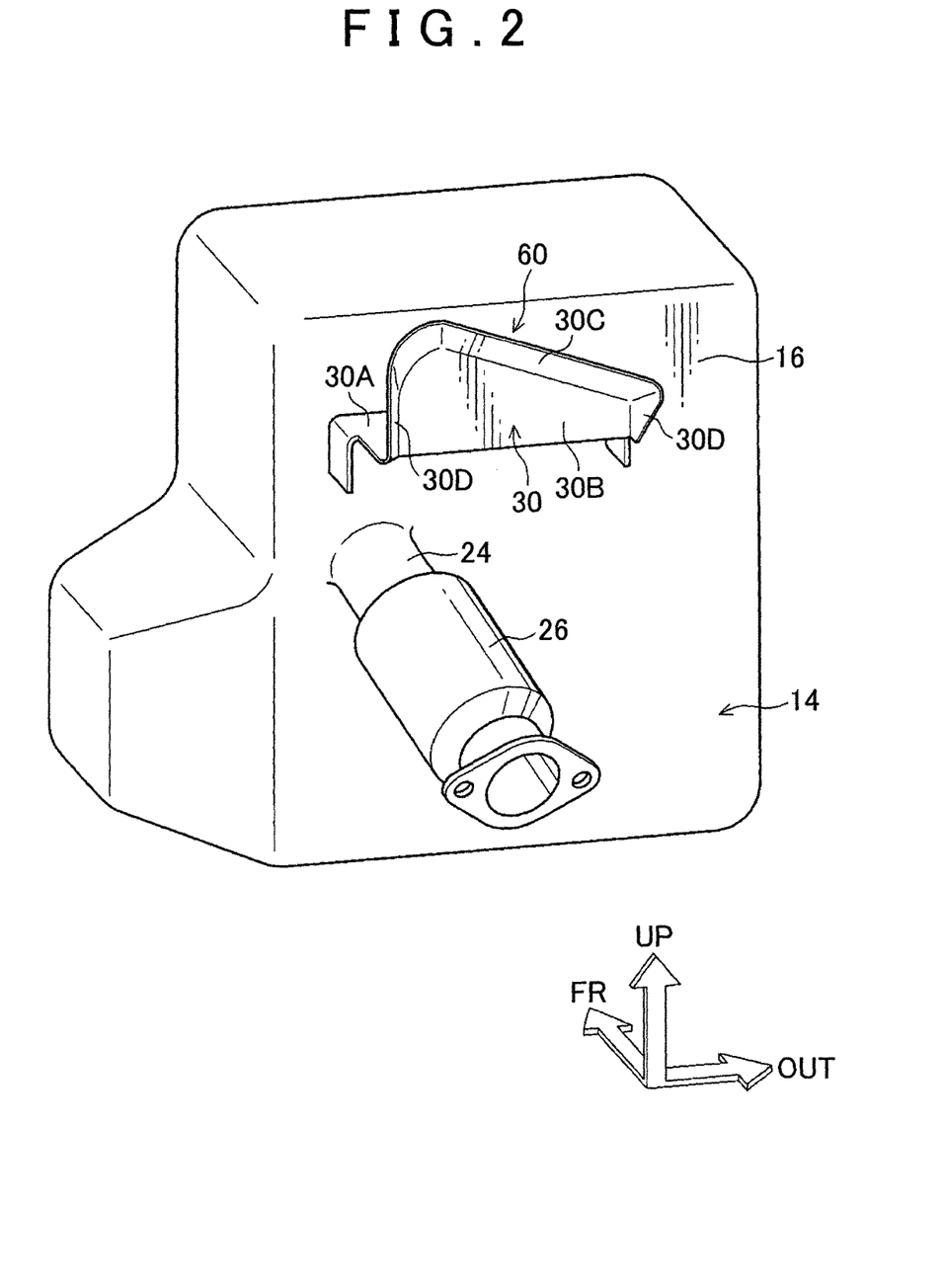
FIG. 2 is a perspective view as seen from a backward side of a vehicle showing a heat insulator provided nearby the engine which is employed in the air guide, structure of vehicle shown in FIG. 1.
Figure 3:
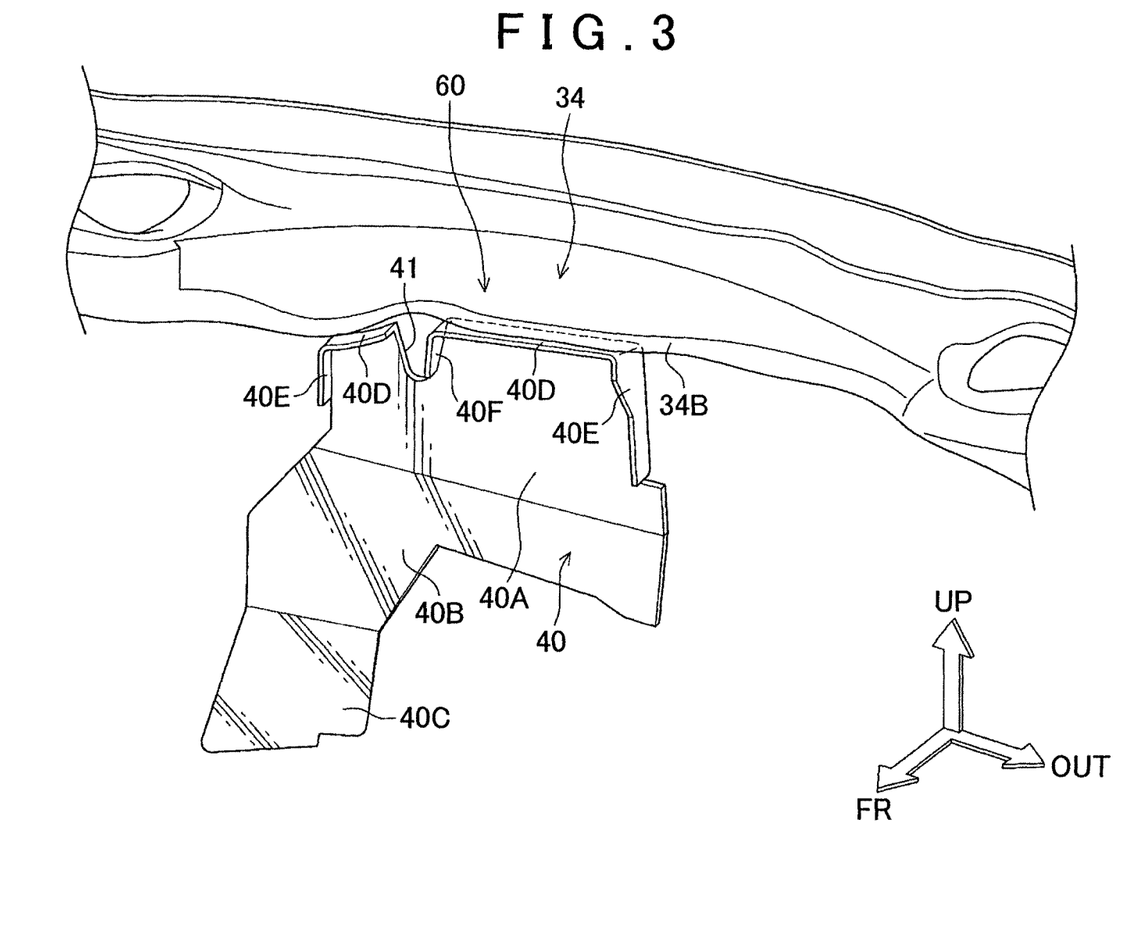
FIG. 3 is a perspective view as seen from, a forward side of a vehicle showing a heat insulator provided nearby the dash panel which is employed in the air guide structure of vehicle shown in FIG. 1.
Figure 4:
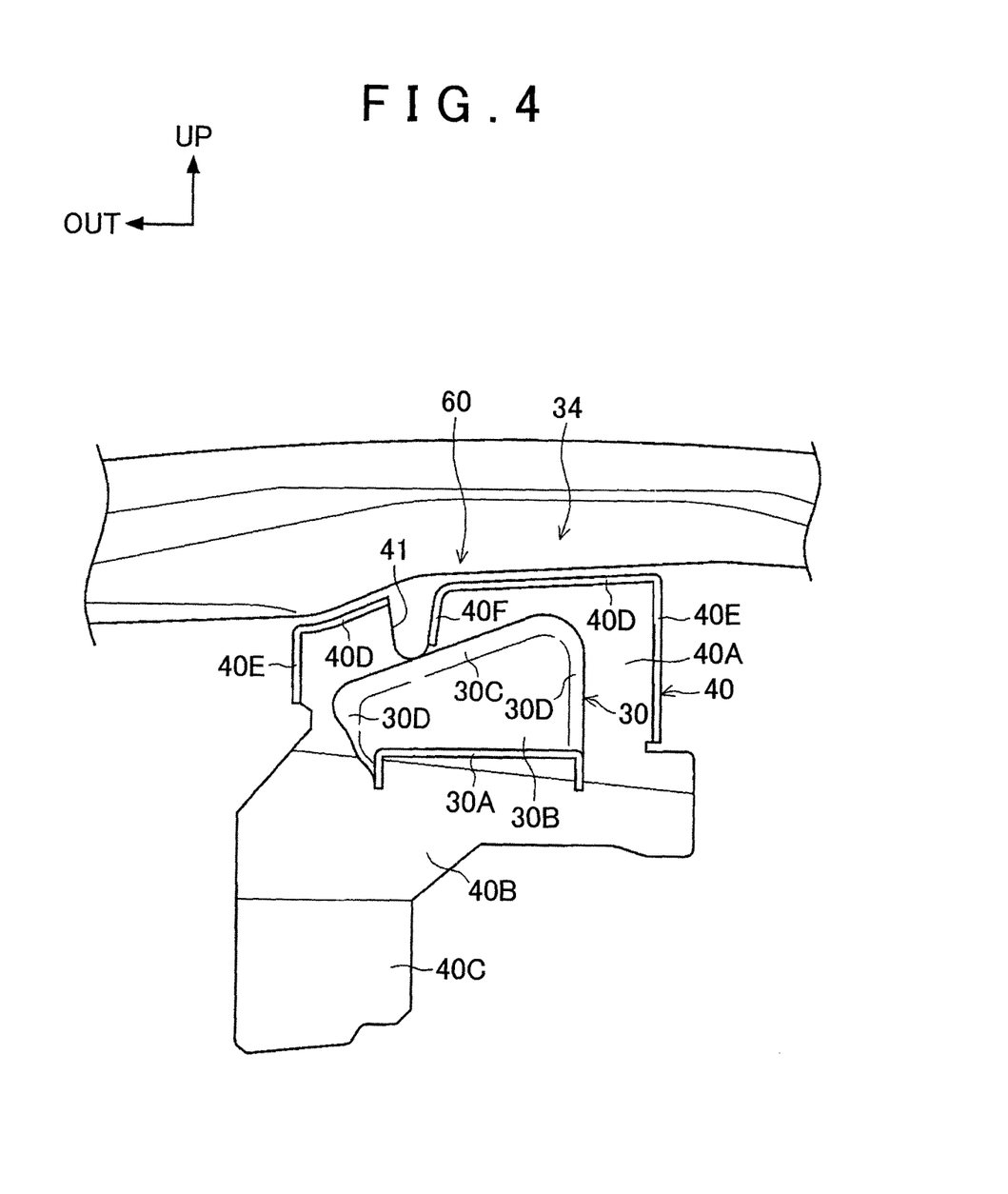
FIG. 4 is a front view showing the heat insulator provided nearby the engine and the heat insulator provided nearby the dash panel as shown in FIG. 1, with the engine and the dash panel removed.

FIG. 2 shows the heat insulator 30 on the engine 14 side for use in the air guide structure of the vehicle 60 of the present embodiment through a perspective view as seen from a backward side of the vehicle. FIG. 3 shows the heat insulator 40 on the cowling panel 34 side (dash panel 20 side) for use in the air guide structure of the vehicle 60 of the present embodiment through a perspective view as seen from a forward side of the vehicle. FIG. 4 shows the heat insulators 30 and 40 with the engine and the dash panel removed, through a front view.

As shown in FIGS. 1 and 2, the heat insulator 30 is formed with a substantially L-shaped section along the forth and back direction of the vehicle. More specifically, the heat insulator 30 includes a mounting portion 30A arranged substantially along the forth and back direction of the vehicle as seen from a backward side of the vehicle and a front end of which is formed substantially in a reversed U shape, and a vertical wall portion 30B extending upward of the vehicle from a rear end of the mounting portion 30A in the forth and back direction of the vehicle. The front end of the mounting portion 30A is fixed to the rear wall portion of the engine 14 with a fixture (not shown). The vertical wall portion 30B is formed substantially in a rectangular shape as seen from a backward side of the vehicle and such that the length in the vertical direction on one side in the width direction of the vehicle (right side in the width direction of the vehicle as seen from the backward side of the vehicle) is shorter than the length in the vertical direction on the other side in the width direction of the vehicle (left side in the width direction of the vehicle as seen from the backward side of the vehicle). In the meantime, the vertical wall portion 30B is not limited to this shape but may be changed.

The heat insulator 30 has a top flange portion 30C which is bent from a top end of the vertical wall portion 30B in the vertical direction of the vehicle obliquely upward and backward of the vehicle, the top flange portion 30C serving as an air guide portion. Further, the heat insulator 30 has side bent portions 30D which are bent from both ends of the vertical wall portion 30B in the width direction of the vehicle backward of the vehicle, the side bent portions 30D serving as a bent portion. The top flange portion 30C and the side bent portions 30D are formed consecutively along a top end of the vertical wall portion 30B and both ends of the vehicle in the width direction thereof. In the present embodiment, the side bent portions 30D which make a pair with the right and left ones are formed so as to expand slightly outward with respect to the width direction of the vehicle as they go backward of the vehicle from the both ends of the vertical wall portion 30B in the width direction of the vehicle.

Consequently, as shown in FIG. 1, air heated by exhaust system such as the exhaust pipe 24 and the catalytic converter 26 goes upward along the backward side (rear surface) of the engine 14 with respect to a vehicle body as shown by an arrow A. At that time, the heated air (hot air) flows along the vertical wall portion 30B of the heat insulator 30 and is further guided obliquely upward and backward with respect to the vehicle by the top flange portion 30C at the top end of the vertical wall portion 30B. Further, because the side bent portions 30D, which are bent backward of the vehicle, are provided on the both ends of the vertical wall portion 30B in the width direction of the vehicle, heated air (hot air) is prevented from striking the rear wall portion of the engine head 16 (from going around to the engine head 16).

As shown in FIGS. 1, 3 and 4, the heat insulator 40 includes, in a side view of the vehicle, a vertical wall portion 40A arranged substantially in the vertical direction of the vehicle, an inclined portion 40B which extends obliquely downward and backward of the vehicle from a bottom end of the vertical wall portion 40A in the vertical direction of the vehicle, and a mounting portion 40C extending downward of the vehicle from an end of the inclined portion 40B in the width direction of the vehicle. The mounting portion 40C is fixed to the front wall portion of the dash panel 20 with a fixture (not shown) or the like.

In the front view of the vehicle, the vertical wall portion 40A is formed substantially in a rectangular shape and a substantially U shaped cutout portion 41 is formed on a top edge thereof. In the front view of the vehicle, the vertical wall portion 40A of the heat insulator 40 is arranged to overlap the vertical wall portion 30B of the heat insulator 30 with respect to the forth and back direction of the vehicle. According to the present embodiment, the length of the vertical wall portion 40A of the heat insulator 40 in the vertical direction of the vehicle and the length in the width direction thereof are set smaller than the length of the vertical wall portion 30B of the heat insulator 30 in the vertical direction of the vehicle and the length in the width direction thereof. Further, in the front view of the vehicle, the top end of the vertical wall portion 40A of the heat insulator 40 extends higher than the top end of the vertical wall portion 30B of the heat insulator 30.

Further, the heat insulator 40 has a top bent portion 40D which is bent forward of the vehicle from the top end of the vertical wall portion 40A in the up and down direction of the vehicle, the top bent portion 40D serving as an air guide portion. The top bent portions 40D are formed on both sides of the cutout portion 41 provided on the top end of the vertical wall portion 40A in the width direction of the vehicle. The top surface of the top bent portion 40D is arranged in the vicinity of a bottom face of the bottom face portion 34B of the cowling panel 34. In other words, the top bent portion 40D is structured in the vicinity of and opposed to the bottom face portion 34B such that the bottom face portion 34B of the cowling panel 34 is arranged in the vicinity thereof. In the side view of the vehicle, the top bent portion 40D of the heat insulator 40 is located on a higher level than the top flange portion 30C of the heat insulator 30 with respect to the vehicle and behind the top flange portion 30C of the heat insulator 30 with respect to the vehicle. The vertical wall portion 40A of the heat insulator 40 may be lack of the cutout portion 41 and in this case, the top bent portion 40D may be provided substantially entirely on the top end of the vertical wall portion.

In the present embodiment, although the top face of the top bent portion 40D is arranged in the vicinity of the bottom face of the bottom face portion 34B of the cowling panel 34, the top face of the top bent portion 40D may make contact with the bottom face of the bottom face portion 34B of the cowling panel 34.

The heat insulator 40 has side bent portions 40E which are bent forward of the vehicle from both ends of the vertical wall portion 40A in the width direction of the vehicle, the side bent portions 40E serving as a bent portion. The top bent portion 40D and the side bent portion 40E are formed consecutively along the top end of the vertical wall portion 40A in the width direction of the vehicle and the both ends of the vertical wall portion 40A in the width direction of the vehicle. A side bent portion 40F is formed on one of side edges of the cutout portion 41 in the vertical wall portion 40A such that the side bent portion 40F is bent forward of the vehicle form the vertical wall portion 40A.

Consequently, as shown in FIG. 1, air (hot air) guided obliquely upward and backward of the vehicle by the top flange portion 30C of the vertical wall portion 30B, is prevented from going around to the dash panel 20 side through the top end of the heat insulator 40, because the top bent portion 40D of the heat insulator 40 is in the vicinity of and opposed to the bottom face portion 34B of the cowling panel 34. Thus, as indicated with an arrow A, air (hot air) flowing obliquely upward and backward of the vehicle by the top flange portion 30C of the vertical wall portion 30B, is guided obliquely upward and forward of the vehicle (to the hood inner panel 44B side) along the curved portion 34A of the cowling panel 34 on the front side of the vehicle from the top bent portion 40D of the heat insulator 40. Further, because the side bent portions 40E which are bent forward of the vehicle are provided on the both ends of the vertical wall portion 40A in the width direction of the vehicle, air (hot air) flowing along the vertical wall portion 40A of the heat insulator 40 is prevented from striking the components 38 on a front wall portion side of the dash panel 20 (going around to the front wall portion side of the dash panel 20).

In the present embodiment, the components 28 of the engine head 16 which require any heat damage countermeasure include for example, a suction duct, a turbo control switch, a wire harness for the engine 14, an ignition coil (IG coil) and the like. Further, the components 38 of the dash panel 20 which require any heat damage countermeasure includes for example, a wire harness placed within the engine room 12, a brake pipe, a silencer for NV (noise and vibration) and the like.

Next, an operation and an effect of the present invention will be described.

As shown in FIG. 1, the heat insulator 30 is provided within the engine room 12 so as to cover the component 28 of the engine 14 on the rear side in the forth and back direction of the vehicle, and the heat insulator 40 is provided so as to cover the components 38 of the dash panel 20 on the front side in the forth and back direction. As shown in FIG. 2, the top flange portion 30C, which is bent obliquely upward and backward of the vehicle, is formed on the top end of the vertical wall portion 30B of the heat insulator 30, and the side bent portions 30D, which are bent substantially backward of the vehicle, are formed on both ends of the vertical wall portion 30B in the width direction of the vehicle.

As shown in FIGS. 3, 4, the top bent portion 40D, which is bent forward of the vehicle, is formed on the top end of the vertical wall portion 40A of the heat insulator 40 and the top face of the top bent portion 40D is arranged in the vicinity of the bottom face portion 34B of the cowling panel 34 (arranged nearby the bottom face portion 34B). Further, the side bent portions 40E, which are bent substantially forward of the vehicle, are formed on both ends of the vertical wall portion 40A of the heat insulator 40 in the width direction of the vehicle.

With such an air guide structure of the vehicle 60, as shown in FIG. 1, radiation heat and hot air generated from the exhaust pipe 24 and the like of the engine 14 are blocked by the heat insulator 30 and the heat insulator 40. Further, following air (hot air) flow is formed by the heat insulator 30 and the heat insulator 40.

As indicated with an arrow A in FIG. 1, air heated by heat generated from the exhaust pipe 24 and the catalytic converter 26 of the engine 14 at the time of dead soak, rises upward of the vehicle along the exhaust pipe 24 and the rear side of the engine 14. Then, as indicated with the arrow A, the heated air (hot air) flows along the vertical wall portion 30B of the heat insulator 30 and further is guided obliquely upward and backward of the vehicle by the top flange portion 30C on the top end of the vertical wall portion 30B. That is, the heated air (hot air) within the engine room 12 is prevented from flowing toward the components 28 of the engine head 16 on the rear side in the forth and back direction of the vehicle by the top flange portion 30C of the heat insulator 30.

Further, because the top face of the top bent portion 40D of the heat insulator 40 is arranged in the vicinity of the bottom face portion 34B of the cowling panel 34 (arranged nearby the bottom face portion 34B), as indicated with the arrow A, the heated air (hot air) is guided obliquely upward and forward of the vehicle from the top bent portion 40D of the heat insulator 40 along the curved portion 34A of the cowling panel 34. That is, the heated air (hot air) is prevented from flowing toward the components 38 of the dash panel 20 on the front side in the forth and back direction of the vehicle through a gap between the top end of the heat insulator 40 and the cowling panel 34. Then, as indicated with the arrow A, the heated air (hot air) within the engine room 12 flows forward of the vehicle along the hood inner panel 44B of the hood 44 from the curved portion 34A of the cowling panel 34. Consequently, a flow of hot air substantially in a specific direction as indicated by the arrow A is formed within the engine room 12 by using buoyancy and inertial force of the hot air. Further, the hot air is prevented from striking the components 28 on the engine head 16 by introducing the hot air along bottom surfaces of the cowling panel 34 and the hood inner panel 44B of the hood 44.

Consequently, the hot air is prevented from flowing disorderly within the engine room 12 thereby suppressing expansion of a range to which heat damage countermeasure is to be taken within the engine room 12. That is, the components 28, 38 are not arranged on a hot air rising path indicated by the arrow A thereby preventing the components 28, 38 from being exposed to the hot air.

As shown in FIG. 2 and the like, the side bent portions 30D, which are bent substantially backward of the vehicle, are formed on both ends of the vertical wall portion 30B of the heat insulator 30 in the width direction of the vehicle. Consequently, when the heated air (hot air) within the engine room 12 flows along the vertical wall portion 30B of the heat insulator 30, the heated air is prevented from striking the rear wall portion of the engine head 16 by the side bent portions 30D (from going around to the rear wall portion of the engine head 16) (see FIG. 1). Thus, the heated air is prevented from striking the components 28 of the engine head 16 on the rear side in the forth and back direction of the vehicle thereby suppressing expansion of the range to which the heat damage countermeasure is to be taken within the engine room 12, effectively.

As shown in FIG. 3, the side bent portions 40E, which are bent substantially forward of the vehicle, are formed on both ends of the vertical wall portion 40A of the heat insulator 40 in the width direction of the vehicle. Consequently, when heated air (hot air) within the engine room 12 flows along the vertical wall portion 40A of the heat insulator 40, the side bent portions 40E prevent the heated air from striking the front wall portion of the dash panel 20 (going around into the front wall portion side of the dash panel 20) (see FIG. 1). Consequently, the heated air is prevented from striking the components 38 of the dash panel 20 on the front side in the forth and back direction of the vehicle thereby suppressing expansion of a range to which the heat damage countermeasure within the engine room 12 is to be taken effectively.

Figure 6:
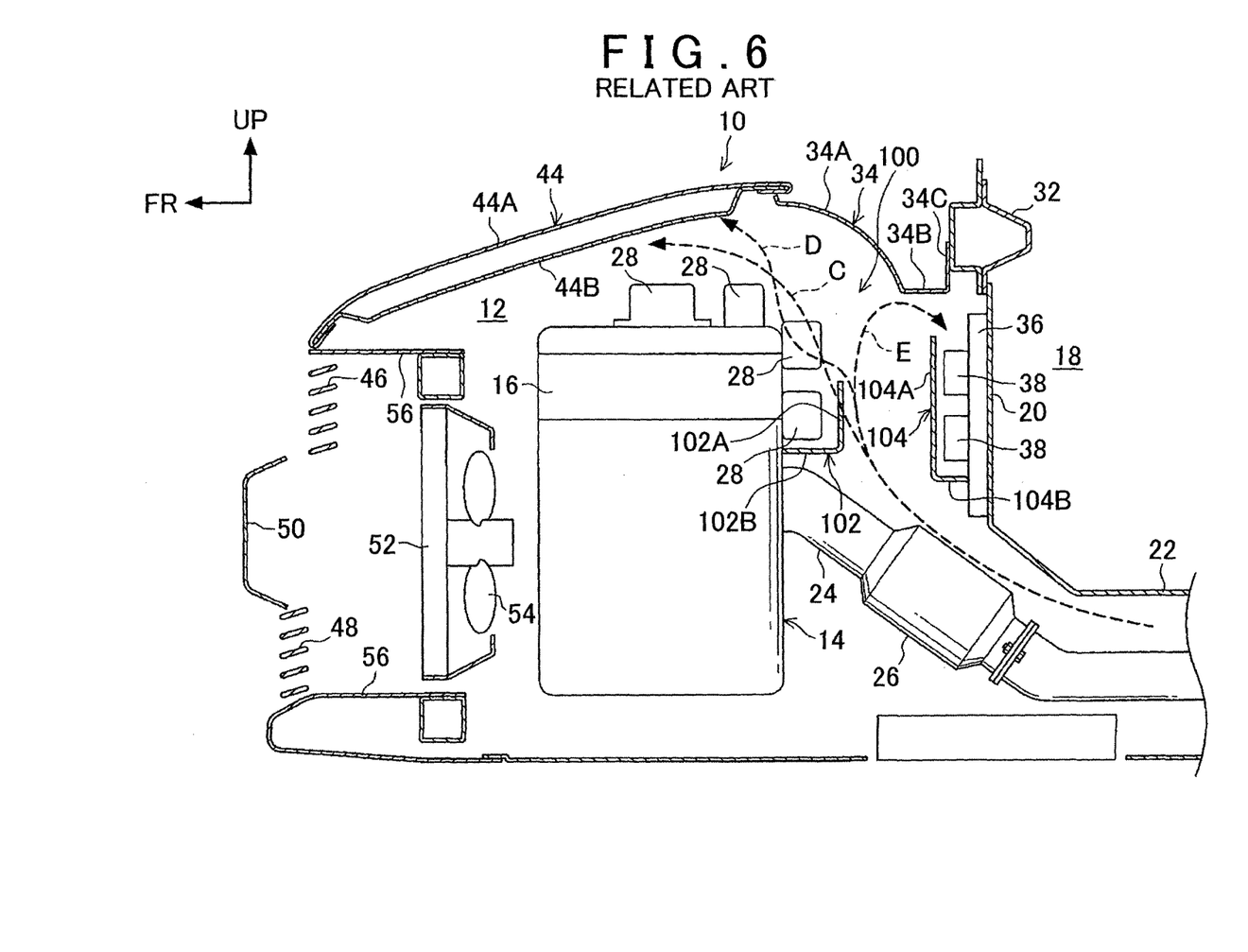
FIG. 6 is a side view showing an interior of an engine room of the front section of vehicle to which the air guide structure of vehicle according to related art is applied.

FIG. 6 shows an interior of an engine room located in the front portion of the vehicle to which the air guide structure of the vehicle 100 of related art has been applied through a side sectional view. As shown in FIG. 6, a heat insulator 102 is provided on a rear wall portion of an engine 14. The heat insulator 102 includes a vertical wall portion 102A arranged in the vertical direction of the vehicle and a mounting portion 102B extending forward of the vehicle from a bottom end of the vertical wall portion 102A. That is, the vertical wall portion 102A of the heat insulator 102 is open upward of the vehicle. Top flange portion as seen in the first embodiment is not provided on the top end of the vertical wall portion 102A, and side bent portions as seen in the first embodiment are not provided on both ends of the vertical wall portion 102A in the width direction of the vehicle (see FIG. 2).

A heat insulator 104 is provided on the front wall portion of the dash panel 20. The heat insulator 104 includes a vertical wall portion 104A arranged in the vertical direction of the vehicle and includes a mounting portion 104B extending backward of the vehicle from a bottom end of the vertical wall portion 104A. That is, the vertical wall portion 104A of the heat insulator 104 is open upward of the vehicle, and a top end of the vertical wall portion 104A is arranged with a predetermined distance from the bottom face portion 34B of the cowling panel 34. Top bent portion as seen in the first embodiment is not provided at a top end of the vertical wall portion 104A, and side bent portions as seen in the first embodiment are not provided on both ends of the vertical wall portion 104A in the width direction of the vehicle of the vertical wall portion 104A (see FIG. 3).

In such an air guide structure of the vehicle 100, air heated by the exhaust pipe 24 of the engine 14 at the time of dead soak, rises upward of the vehicle. At that time, as shown with arrows C, D, the heated air (hot air) within the engine room 12 strikes the components 28 provided on the periphery of the engine head 16 from the top end of the vertical wall portion 102A of the heat insulator 102, and the heated air (hot air) goes around into a rear side of the engine head 16 from a side of the vertical wall portion 102A of the heat insulator 102, striking the components 28. Further, as shown with an arrow E, the heated air (hot air) within the engine room 12 goes around to the dash panel 20 side through a gap between the top end of the vertical wall portion 104A of the heat insulator 104 and the cowling panel 34, and strikes the components 38 provided on the side of the dash panel 20.

That is, the air (hot air) heated within the engine room 12 flows disorderly thereby possibly expanding a range to which the heat damage countermeasure within the engine room 12 is to be taken.

Contrary to this, according to the air guide structure of the vehicle 60 of the present embodiment, the heated air (hot air) within the engine room 12 flows upward of the vehicle by means of the heat insulators 30, 40, thereby suppressing expansion of the range to which the heat damage countermeasure is to be taken within the engine room 12.

Next, a second embodiment of the air guide structure of the vehicle of the present embodiment will be described with reference to FIG. 5. In the meantime, like reference numerals are attached to the same components as in the above-described first embodiment and a description thereof is omitted.

Figure 5:
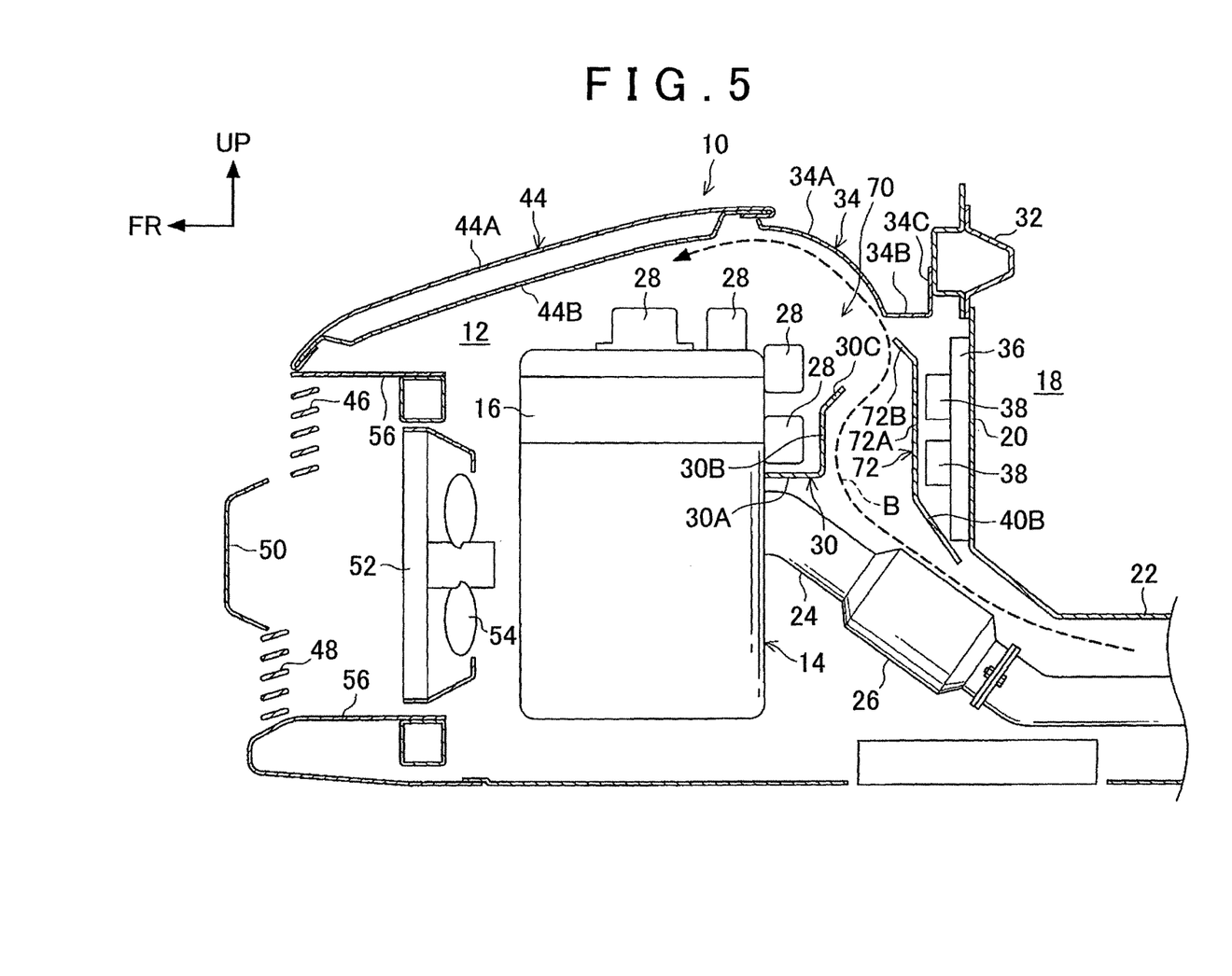
FIG. 5 is a side view showing an interior of an engine room of the front section of vehicle to which the air guide structure of vehicle according to a second embodiment is applied.

As shown in FIG. 5, an air guide structure of the vehicle 70 includes a heat insulator 72 on a front side of the vehicle with respect to the dash panel 20. In a side view of the vehicle, the heat insulator 72 includes a vertical wall portion 72A arranged substantially in the vertical direction of the vehicle and includes a top flange portion 72B which is bent obliquely upward and forward of the vehicle from a top end of the vertical wall portion 72A in the vertical direction of the vehicle, the top flange portion 72B serving as an air guide portion. A gap is formed between the top end of the top flange portion 72B and a bottom face portion 34B of the cowling panel 34. The top flange portion 72B is set when the top end of the heat insulator 72 and the bottom face portion 34B of the cowling panel 34 cannot be arranged in the vicinity of each other.

The same heat insulator 30 as the first embodiment is provided on the backward side of the vehicle of the engine 14. The top flange portion 72B of the heat insulator 72 is arranged on a higher level than top flange portion 30C of the heat insulator 30 with respect to the vehicle and behind the top flange portion 30C of the heat insulator 30 with respect to the vehicle.

With such an air guide structure of the vehicle 70, as shown with an arrow B, the heated air (hot air) within the engine room 12 is guided obliquely upward and backward of the vehicle by the top flange portion 30C of the heat insulator 30. Further, because the top flange portion 72B is provided obliquely upward and forward of the vehicle from the vertical wall portion 72A of the heat insulator 72, the heated air (hot air) within the engine room 12 is guided obliquely upward and forward of the vehicle along the top flange portion 72B from the vertical wall portion 72A.

Consequently, the heated air (hot air) within the engine room 12 is prevented from flowing to the components 38 of the dash panel 20 on the front side in the forth and back direction of the vehicle through the gap between the top end of the heat insulator 72 and the bottom face portion 34B of the cowling panel 34. Then, as shown with an arrow B, the heated air (hot air) within the engine room 12 flows forward of the vehicle along the hood inner panel 44B of the hood 44 from the curved portion 34A of the cowling panel 34. Consequently, the heated air (hot air) within the engine room 12 is prevented from flowing disorderly thereby suppressing expansion of a range to which the heat damage countermeasure within the engine room 12 is to be taken.

In the meantime, in the above-described first embodiment, the shape, position and size of the top flange portion 30C and the side bent portion 30D of the heat insulator 30 are not limited to the above-described embodiments but may be changed. Further, as regards the structure of the air guide portion, although the top flange portion 30C extends obliquely upward of the vehicle from the top end of the vertical wall portion 30B, it is not limited to this example. As the structure of the air guide portion, for example, the flange portion may extend substantially horizontally in the forth and back direction of the vehicle from the top end of the vertical wall portion of the heat insulator.

In addition, in the above-described first embodiment, the shape, position and size of the top bent portion 40D and the side bent portions 40E of the heat insulator 40 are not limited to the above-described embodiments but may be changed. Further, in the first embodiment, although the vertical wall portion 40A of the heat insulator 40 is provided with the top bent portion 40D, any structure which brings the top end of the vertical wall portion adjacent to or in contact with the cowling panel 34 may be employed if that structure can be arranged in the vicinity of the cowling panel 34.

Further, in the above-described second embodiment, the shape, position and size of the top flange portion 72B of the heat insulator 72 are not limited to the above-described embodiments but may be changed.

Further, as the structure of the air guide portion, the first and the second embodiments have employed a structure in which the flange portions (bent portions) are provided on the periphery of the heat insulator, however, the structure of the air guide portion is not limited to these examples. For example, as a modification of the air guide portion, the heat insulator may be entirely curved or bent gradually so that the entire heat insulator may form a concave shape. Further, it is permissible to form the heat insulator entirely into a concave shape while the flange (bent portion) may be provided on its periphery.

The invention claimed is:

1. An air guide structure of a vehicle comprising:
    a pair of heat insulators provided within an engine room, each of the pair of heat insulators having a plurality of heat insulator segments with different orientations, the pair of heat insulators including: (i) a first heat insulator disposed on a rear side of an engine in a front and rear direction of the vehicle with respect to the engine arranged within the engine room, and (ii) a second heat insulator disposed on a front side of a dash panel in the front and rear direction of the vehicle, the dash panel being arranged on a rear side of the engine room of the vehicle;
    an air guide portion, which is formed as one of the plurality of heat insulator segments of at least one of the pair of heat insulators, the air guide portion extending at a top of the at least one of the pair of heat insulators, the air guide portion being arranged to guide air heated by an exhaust system from the engine upward in the vehicle; and
    a plurality of bent portions provided on both sides in a width direction of the vehicle with respect to the pair of heat insulators provided on front side in the front and rear direction of the vehicle with respect to the dash panel, the plurality of bent portions being bent towards the front side of the vehicle.

2. The air guide structure of the vehicle according to claim 1, wherein:
    the pair of heat insulators are arranged to cover components provided on a front side of the vehicle in the front and rear direction of the vehicle with respect to the dash panel; and
    the air guide portion is arranged in a vicinity of a cowling arranged on an upper side of the vehicle with respect to the dash panel.

3. The air guide structure of the vehicle according to claim 1, wherein:
    the air guide portion is formed at a top end of a vertical wall portion of at least one of the pair of heat insulators; and
    the air guide portion is constructed as a flange portion extending from the vertical wall portion obliquely upward with respect to the vehicle or from the vertical wall portion horizontally in the front and rear direction of the vehicle.

4. The air guide structure of the vehicle according to claim 1, wherein the air guide structure of the vehicle includes the pair of heat insulators provided on the rear side in the front and rear direction of the vehicle with respect to the engine and the pair of heat insulators being provided on the front side in the front and rear direction of the vehicle with respect to the dash panel.

5. The air guide structure of the vehicle according to claim 1, wherein:
    the vehicle includes the engine room, the engine, the dash panel and the air guide structure; and
    the air guide structure is mounted in the engine room.

6. An air guide structure of a vehicle comprising:
    at least one heat insulator provided within an engine room, the at least one heat insulator having a plurality of heat insulator segments with different orientations, the at least one heat insulator being located on a rear side of an engine in a front and rear direction of the vehicle with respect to the engine arranged within the engine room;
    an air guide portion, which is formed as one of the plurality of heat insulator segments of the at least one heat insulator, the air guide portion extending at a top portion of the at least one heat insulator, the air guide portion being arranged to guide air heated by an exhaust system from the engine upward of the vehicle, the air guide portion extending away from the at least one heat insulator and being angled with respect to the at least one heat insulator, such that the air guide portion is angled towards the rear side of the engine room in the front and rear direction of the vehicle; and
    a plurality of bent portions provided on both sides in a width direction of the vehicle with respect to the pair of heat insulators provided on front side in the front and rear direction of the vehicle with respect to the dash panel, the plurality of bent portions being bent towards the front side of the vehicle.

7. An air guide structure of a vehicle comprising:
    a pair of heat insulators provided within an engine room, each of the pair of heat insulators having a plurality of heat insulator segments with different orientations, each of the pair of heat insulators being located on: (i) a rear side of an engine in a front and rear direction of the vehicle with respect to the engine arranged within the engine room, and (ii) a front side of a dash panel in the front and rear direction of the vehicle, the dash panel being arranged on a back side of the engine room of the vehicle with respect to the engine;
    an air guide portion, which is formed as one of the plurality of heat insulator segments of each of the pair of heat insulators, the air guide portions extending at a top portion of each of the pair of heat insulators, the air guide portions being arranged to form an air passage that guides air heated by an exhaust system from the engine upward of the vehicle, the air guide portions extending away from each of the pair of heat insulators and being angled with respect to each of the pair of heat insulators, such that (i) the air guide portion formed on the heat insulator located on the rear side of the engine is angled towards the rear side of the engine room in the front and rear direction of the vehicle, and (ii) the air guide portion formed on the heat insulator located on the front side of the dash panel is angled towards a front side of the engine room in the front and rear direction of the vehicle; and
    a plurality of bent portions provided on both sides in a width direction of the vehicle with respect to the pair of heat insulators provided on front side in the front and rear direction of the vehicle with respect to the dash panel, the plurality of bent portions being bent towards the front side of the vehicle.

* * * * *